219-121 SR
MTR04 XR 2,750,541
June 12, 1956 R. S. OHL 2,750,541
SEMICONDUCTOR TRANSLATING DEVICES
Filed Jan. 31, 1950 5 Sheets-Sheet 1
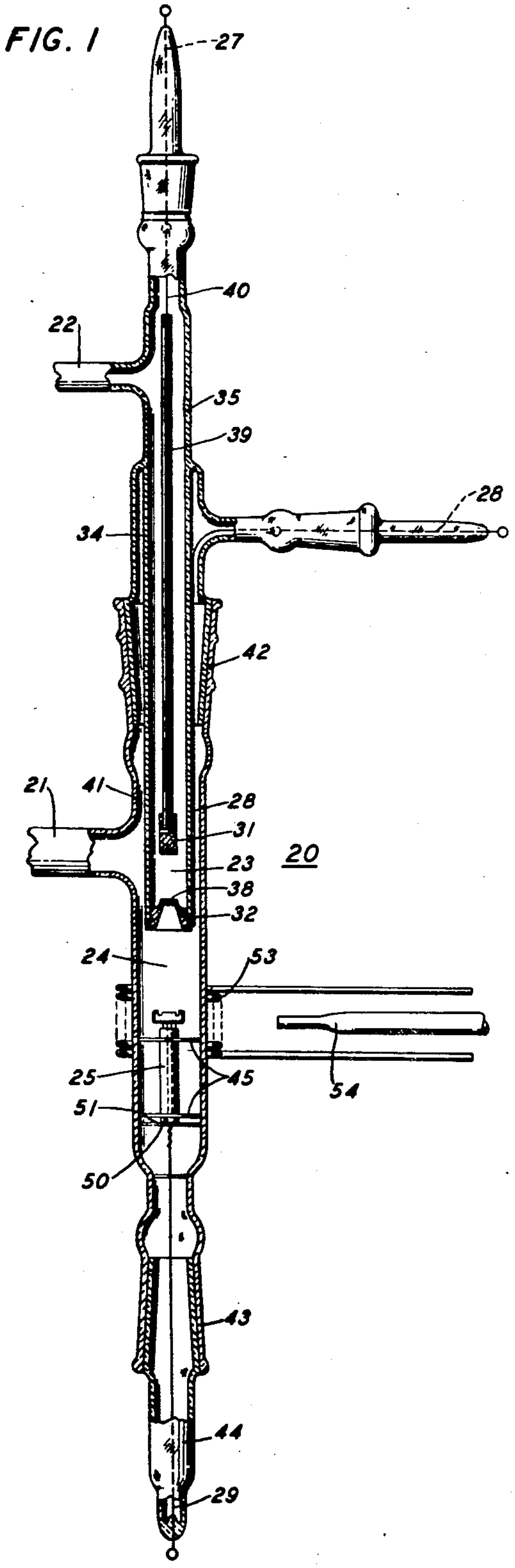
FIG. 2
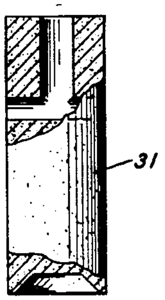
FIG. 3
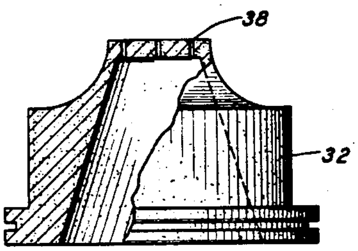
FIG. 4
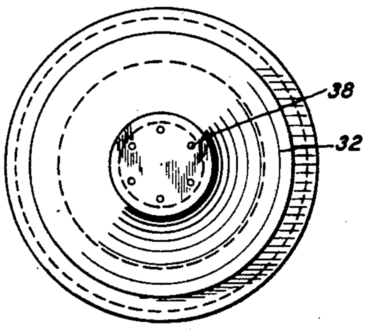
INVENTOR
R. S. OHL
BY [signature]
ATTORNEY INVENTOR
R. S. OHL
BY [signature]
ATTORNEY INVENTOR
R. S. OHL
BY [signature]
ATTORNEY June 12, 1956 R. S. OHL 2,750,541

SEMICONDUCTOR TRANSLATING DEVICES

Filed Jan. 31, 1950 5 Sheets-Sheet 4

INVENTOR
R. S. OHL

BY [signature]

ATTORNEY

INVENTOR
R. S. OHL
BY
ATTORNEY

United States Patent Office 2,750,541
Patented June 12, 1956

2,750,541

SEMICONDUCTOR TRANSLATING DEVICE

Russell S. Ohl, Fair Haven, N. J., assignor to Bell Telephone Laboratories, Incorporated, New York, N. Y., a corporation of New York Application January 31, 1950, Serial No. 141,512

13 Claims. (Cl. 317—235)

This invention relates to semiconductor signal translating devices and to methods of preparing semiconductive bodies or elements for use in such devices.

In one specific aspect, the invention pertains to treatment of a surface of a body of semiconductive material, especially silicon, to alter or control the properties thereof in a manner to realize novel and advantageous electrical characteristics for devices utilizing such a body. Illustrative of such devices are rectifiers, amplifiers, wave generators and photosensitive cells.

One general object of this invention is to improve the performance characteristics of semiconductor signal translating devices. Another general object of this invention is to enable and facilitate the production of semiconductive bodies or elements having prescribed advantageous electrical characteristics. More specific objects of this invention are to increase the current carrying capacity and peak back voltage of semiconductor type rectifiers, to enhance the characteristics, such as sensitivity, speed of response and stability, of photocells, to obtain improved performance for point contact type semiconductor harmonic producers, detectors, frequency converters and the like, simplify and expedite the fabrication of very high frequency, i. e. microwave, semiconductor translating devices and facilitate the fabrication of amplifiers, of the type known as transistors, including a body of P conductivity type semiconductive material, such as silicon.

In accordance with one broad feature of this invention, improvement of the electrical characteristics of a body of semiconductive material is effected by subjecting a surface of the body to ion bombardment.

In accordance with a more specific feature of this invention, a body of semiconductive material, such as silicon, is subjected to bombardment by ions of particular character and with particular energies and under particular conditions to effect a controlled alteration in the properties of a surface layer of the body, thereby to realize prescribed advantageous performance characteristics for translating devices including the body.

Another feature of this invention pertains to the production of semiconductive bodies for translating devices by bombarding a surface of the bodies with ions of various elements, of various mixtures of elements, and of various energies while the surface is held at selected temperatures.

A further feature of this invention resides in the control of conditions during the bombardment treatment of semiconductors to determine the predominating characteristics of the final product.

The invention and the above-noted and other features thereof will be more readily understood from the following detailed description when read with reference to the accompanying drawings in which:

Fig. 1 shows one form of bombarding apparatus in sectioned elevation;

Fig. 2 is a broken-away elevational view of the anode on the ion gun shown in the apparatus of Fig. 1;

Fig. 3 is a broken-away elevational view of the cathode of the ion gun of Fig. 1;

Fig. 4 is a plan view of the cathode of Fig. 3;

Figure 5:
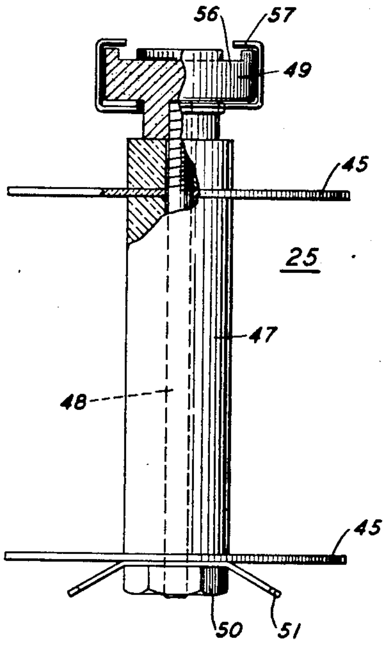
Fig. 5 shows one form of holder for the semiconductor material with portions broken away to show details of its construction.

The invention is predicated, in part, upon the discovery that the bombardment of a body of high purity silicon with ions results in marked changes in the properties thereof and, more particularly, in the properties of a thin layer or stratum at the bombarded surface. This result is explainable upon the basis of the effect of the ions on the silicon lattice, notably alternations of the energy level of the silicon atoms in close proximity to the bombarded surface.

This has the effect of producing a potential barrier very close to the surface. This barrier has properties such that when electrons are released within the thin layer by incident light of a suitable wavelength they cannot pass into the main body of the semiconductor but are trapped in the surface and can then be collected and returned to the main body of the material through a suitable electrical circuit. The altered energy level of the atoms in the bombarded surface has the further effect that when an electric field is produced across this barrier it is difficult for electrons to penetrate the formed layers and enter an electrode contacting the activated surface, thus producing a high back resistance device. With a reversed polarity the electrons flow easily from the contacting electrode to the body of the material.

More particularly, the effect of ionic bombardment is an electromechanical working of the silicon surface which tends to rearrange the crystal lattice. This is substantiated by consistent experimental results of a mechanical, electrical and physical nature. For example, it has been found that a piece of silicon which has been given an optical polish and has been bombarded over sharply defined areas will have a bombarded surface which is depressed about 600 angstrom units below the unbombarded area. In accomplishing this, care has been taken to check whether any silicon is lost from the bombarded surface and no indication that this is the case has been found. Electrically, an ionically bombarded silicon surface exhibits a substantially uniform but altered surface resistivity. An untreated highly polished silicon surface generally exhibits a higher resistivity than the surface of a freshly broken piece of the same kind of silicon. After ionic bombardment of such a polished surface the surface resistivity is generally lowered often below that of the surface of a freshly broken piece of silicon. While boron migrates quite readily in the body of the substantially pure silicon under consideration here it does not migrate as readily in the surface which has been altered by ionic bombardment. Thus after a surface has been bombarded the wafer can be exposed to boron contaminants which will enter the underlying portions but will not migrate into the thin layer which has been modified by bombardment. These results and others have led to the conclusion that the ionic bombardment is a mechanical working of the surface layer by the striking of the ions similar to the work hardening of metals. Applicant for convenience has termed this effect a "densifying" of the silicon surface.

Further effects upon the electrical characteristics of the silicon have been observed where ions of certain significant impurities are added to the bombarding ion stream. These impurities are thought to enter the crystal lattice and function in a manner similar to the accepted theory of impurities in semiconductors as set forth in the literature such as volume 15 of the Radiation Laboratory Series, "Crystal Rectifiers" by H. C. Torrey and C. A. Whitmer, pages 64 to 67, namely, that the impurity changes the number of electrical carriers present in the material thereby changing its electrical characteristics. Thus, the term "significant impurity" is used herein to denote those impurities which affect the electrical characteristics of the material such as its resistivity, photosensitivity, rectification and the like, as distinguished from other impurities which have no apparent effect on these characteristics.

The ionic bombardment treatment has been carried out in apparatus of the type disclosed in Fig. 1 comprising a closed envelope 20 of glass or other suitable material which may be evacuated through the tubing 21 by a vacuum pump (not shown) to the order of $10^{-5}$ millimeters of mercury and may be continuously held at a low pressure of this order of magnitude. The envelope contains an ion chamber or gun 23, a bombardment chamber 24, a holder 25 for the piece of material to be treated, and lead-in conductors 27, 28 and 29 providing means for applying a potential to the anode 31 and cathode 32 of the ion chamber and to the work holder 25 in the bombardment chamber, respectively.

Ion chamber 23 is formed by the reentrant tube 34, depending from the top section 35 of envelope 20, and the cathode 32 closing the end of the tube. The cathode, which may be of special spectroscopic grade graphite, free of boron, obtained from the National Carbon Company, is provided with leakage holes 38, as may best be seen in Figs. 3 and 4 to permit the ions produced in chamber 23 to pass into bombardment chamber 24. A fine wire 40 secured to lead-in conductor 27 and insulated by tube 39, of glass or quartz, provides an electrical connection and a mechanical support for anode 31 suspended in chamber 23. While the anode shown in Figs. 1 and 2 is constructed of the same material as the cathode for ordinary ionic bombardment treatments, a second type of anode (not shown) in the form of a wire gauze basket, of some material such as nickel, may be used where it is desirable that the bombarding ion stream be contaminated with significant impurities, these impurities such as the elements phosphorus, arsenic or barium being placed in the anode basket. Those elements of the third column of the periodic table tend to produce p-type conduction and those elements in the fifth column of the periodic table tend to produce n-type conduction in both germanium and silicon. Since these materials influence the type of conduction occurring in the semiconductor, they will be identified generically hereinafter as conductivity type determining impurities.

Controlled atmospheres are employed in the ion chamber by first evacuating the envelope 20 through tubing 21 and thereby the ion chamber through the cathode holes 38, and then admitting controlled amounts of any desired gas through the tube 22 into chamber 23. The pressure of the ionizing atmosphere can be controlled by continued pumping from tube 21, reasonable pressures in chamber 23 being from 0.1 to 10 millimeters of mercury, while the pressure is kept considerably lower in the bombarding chamber, e. g., 0.2 millimeter or less of mercury, it being desirable to keep the mean free path of the ions as long as possible there so that high accelerating voltages may be employed on the ion stream without causing a discharge.

The main body portion 41 of envelope 20 is provided with tapered joints 42 and 43 at its ends by which it is joined to section 35 containing the ion chamber and a section 44 containing the seal through which passes lead-in conductor 29. These joints may be sealed in any well-known manner as by spreading a suitable grease over the tapered portions.

Work holder 25 is supported in the main body 41 opposite the cathode holes 38 in the wall of ion chamber 23 whereby ions passing from the chamber fall upon the exposed surface of the material mounted in the holder. The holder is held in its proper position by the mica separators 45.

Figure 6:
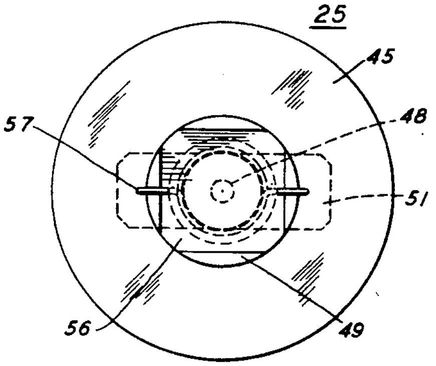
Fig. 6 is a plan view of the holder of Fig. 5.

An electric field is set up between the bombarded surface and the cathode of the ion chamber in order to accelerate the ions which pass through the cathode holes to that surface. This is achieved, as may best be seen from Figs. 1, 5 and 6, by providing the work holder 25, which has an insulating body portion 47 of some material such as quartz, with an axial conductor 48 extending from a heater button 49 on which the work is held to the bottom of the body. The conductor 48 is terminated on the lower portion of the holder 25 with a nut 50 and a radially extending spring contact 51. Thus the work piece can be mounted on the button 49 of the holder 25 and the assembly including the mica separators 45 inserted into body 41 through the funnel-shaped mouth provided by joint 42 and carried further into the body until the nut 50 or contact 51 engages a contact 53 connected to lead-in conductor 29. The contact 51 is supported on separator 45 which is held in position by the wall of body 41.

Since the temperature of the work piece during bombardment is also important in determining the electrical properties of the final product, an induction coil 53 is mounted coaxially of and in the plane of the work piece outside the envelope 20 whereby high frequency current applied to the coil induces heating current in the conducting button 49, which may be of Nichrome, to heat it and in turn the work piece. In order to keep the coil 53 and the adjacent walls of the envelope 20 cool, air supplied from the jet 54 is circulated around these elements.

The material treated in this apparatus is prepared from finely divided silicon having a purity in excess of 99.9 per cent which may be produced by pyrolytic reduction of silicon tetrachloride on zinc at high temperature. A typical batch of this type of material supplied by E. I. du Pont de Nemours and Company included the following material:

| | Percent |
|---|---|
| Silicon | 99.95 |
| Iron | .03 |
| Calcium | .005 |
| Sodium | .005 |
| Copper | .001 |
| Manganese | .001 |
| Magnesium | .001 |

In some samples traces of zinc, silver and aluminum have also been found.

The material is heated in a silica crucible in either a high vacuum or an inert atmosphere to a temperature 150 degrees to 200 degrees centigrade above the fusion point of silicon and is then slowly progressively cooled along an axis so that the portion of the resulting ingot which is last to cool contains the major portion of the impurities. As a result of this progressive cooling and the variable impurity concentration the ingot is not homogeneous in its electrical characteristics, that which is first to cool exhibiting a higher resistivity and peak back voltage than that which is last to cool. While all of this material tends to be of P-type conductivity, i. e., conduction by positive carriers or holes as opposed to conduction by negative carriers or electrons, the portion which is last to cool will sometimes be of N-type conductivity.

In preparing this silicon for surface activation it is first cut into slabs, convenient thicknesses being from .012 to .040 inch, and then cut into wafers of the desired size. The face of the wafers ultimately exposed to bombardment is next given an optical polish as free from scratches as possible, for example, by the method and apparatus set forth in the application of R. S. Ohl, Serial No. 691,346, filed August 17, 1946, now Patent No. 2,606,405, issued August 12, 1952. Just before placing the wafer in the bombardment chamber it is cleaned in reagent chloroform to free the surfaces of grease and is placed in 25 per cent hydrofluoric acid for about fifteen minutes. Thereafter it is washed with distilled water, dried with a paper tissue and placed in the square depression 56 under wire clamp 57 in the conductive heating button 49 on the work holder 25.

The work holder and the mounted wafer are then placed in the vacuum chamber 20 and the chamber sealed. It is then evacuated to a pressure of about $10^{-3}$ millimeters of mercury and the wafer is heated by high frequency induction to the desired temperature as will be discussed hereinafter. When the target reaches the proper temperature, the target potential is applied by means of lead-in conductor 29 and gas is admitted through tubing 22 to ion chamber 23. The ion arc between the cathode 28 and anode 31 is then struck by the application of a constant potential of about 600 to 900 volts between the electrodes and after an arc is established it is adjusted by suitable adjustment of the gas flow and the arc voltage to yield the desired bombarding current. As the bombardment period is completed, the arc is broken by removing the voltage from the electrodes and the sample is allowed to cool and is brought to atmospheric pressure. Upon removal from the holder 25, the wafer is ready for the application of contacting electrodes.

While silicon surfaces have been activated with various ionized gases such as air, oxygen, hydrogen, nitrogen, helium, argon, water vapor, carbon monoxide and chloroform, it has been found to be most advantageous to use helium or argon in the production of material for photocells and high voltage rectifiers. Helium does not contaminate the pumping system, is easily cleaned from adsorbing surfaces, is most easily pumped, does not combine chemically to form contaminating deposits and can be obtained in a high state of purity. Argon has a greater mass and does not pump quite so easily.

Photosensitive, rectifying, amplifying and the like type surfaces can be produced by surface bombardment of silicon with high purity ionized gases such as helium, nitrogen and argon. The characteristics which the silicon surface will have, or at least the characteristics which predominate, are determined by the degree of densifying which is accomplished by bombardment, the material which is being bombarded, and the temperature of that material. The degree of working depends in turn upon the mass of the ions (argon having about ten times the mass of helium), the energy of the ions on striking the silicon, the density of the ions in the stream and the total time of bombardment.

In all of the activating processes, the gas pressure in the bombardment chamber during bombardment advantageously is kept at a sufficiently low pressure so that which leaked through the holes in the cathode was pumped out rapidly enough to increase the mean free path in the target region and substantially prevent ionization from the bombardment stream current. The gas pressure in the ion chamber or gun is maintained between 0.1 and 10 millimeters of mercury during bombardment, while the target area or bombardment chamber pressure was between $10^{-1}$ and $10^{-3}$ millimeters of mercury.

Figure 9:
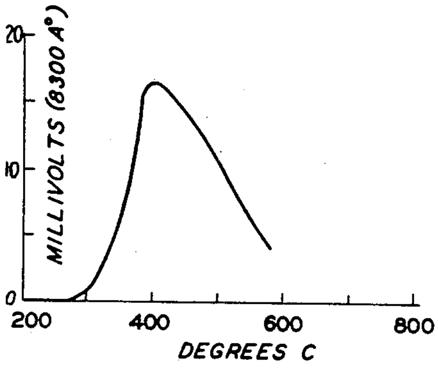
Fig. 9 is a plot showing the relationship between the surface temperature of the silicon during ionic bombardment and the photoresponse of the finished surface.

The temperature of the silicon during the bombardment has a marked effect on the character of the product. A curve showing the photovoltaic activity of the surface in terms of the target temperature when employed in a photocell constructed as described hereinafter is disclosed in Fig. 9. This curve shows that a photoresponse is obtained from a sample bombarded while held at temperatures of from somewhat less than 300° C. to somewhat greater than 550° C., and that particularly advantageous results are realized within a critical temperature range of about 60 degrees in the region of about 400° C. The particular curve shown in Fig. 9 applies only to the particular silicon samples which were used, these samples having been cut from only one portion of a single ingot. It is, therefore, to be understood that materials having other constituents than these will exhibit somewhat different critical temperatures. It is to be noted, however, that these temperatures are very close to the critical Hall effect temperature, i. e., that temperature at which no Hall effect exists in the material.

Ion bombardment at lower temperatures than the critical range modify the back voltage characteristics of the unit so that higher peak back voltages of the order from 500 to 700 volts at 60 cycles have been obtained before impairment of the rectifier set in. Such rectifiers have been used at a constant potential in excess of 300 volts. In general, it has been found that bombardment at higher temperatures causes a drop in the reverse rectifier impedance.

Two types of photo effects have been realized by bombardment of silicon, namely, photoresistive and photovoltaic effects. These terms are employed herein in referring to a device to indicate its predominant characteristics, it being understood that these photosensitive surfaces are both photoresistive and photovoltaic at the same time. Treatment above the critical temperature of 400° C. tends to give less advantageous photoresistive effects than treatment at below that temperature. Hence, to produce a unit which is predominately photoresistive, the bombardment should take place below 400° C. and for one predominately photovoltaic, it should be treated above 400° C., that temperature being in the range in which photovoltaic activity is at a maximum, as evidenced by Fig. 9.

Figure 10A:
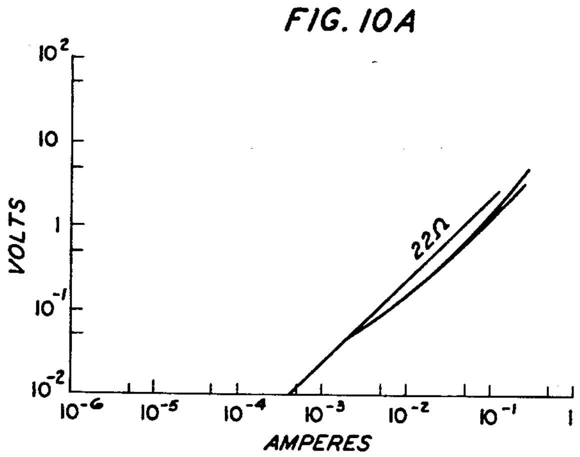
Figs. 10A to 10E are logarithmic plots of the direct-current characteristic of silicon units treated with ions of various energy levels plotted as voltage against current and current against light units.
Figure 10B:
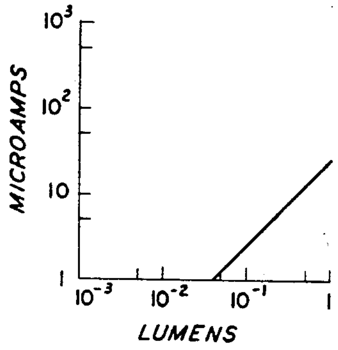
Figure 10C:
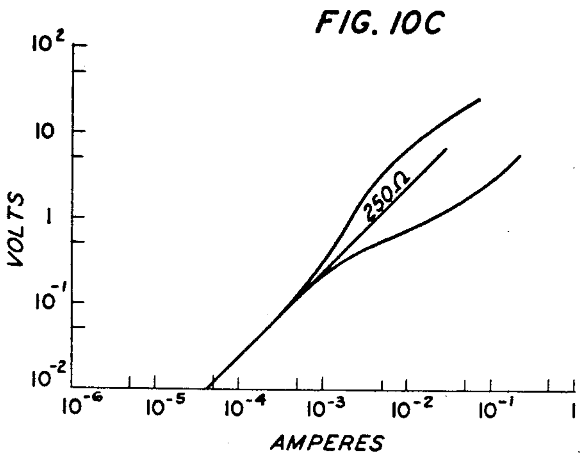
Figure 10D:
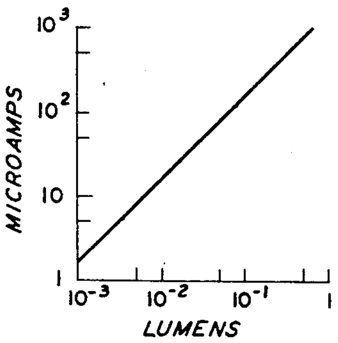
Figure 10E:
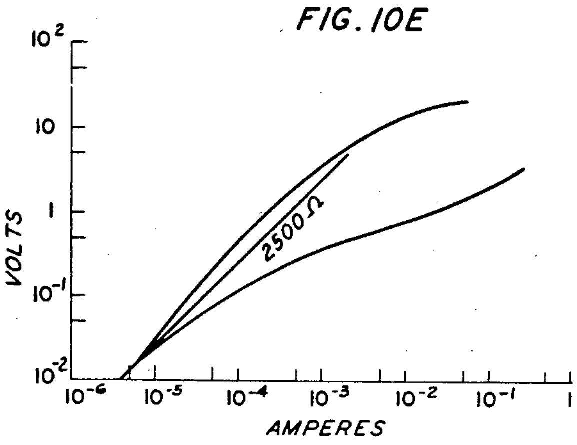

A still further control in the activation of silicon surfaces resides in bombarding them with ions of varied energies. Control of the ion energies is possible by controlling the potential of the bombarded surface relative to the ion gun cathode. The curves in Figs. 10A, 10C, and 10E show the direct current characteristics of rectifiers whose semiconductive elements were bombarded with nitrogen ions of various energies, namely, 300-volt ions, 1200-volt ions and 8200-volt ions, respectively, while Figs. 10B and 10D illustrate the photovoltaic characteristics of photocells having silicon elements which were bombarded by 45- and 1200-volt ions, respectively. The silicon wafers tested to obtain the results shown in Figs. 10A through 10E were cut from about the middle of the silicon ingot and, therefore, they contain a greater percentage of impurity than those portions of the ingot which froze earlier. These samples were heated to the critical temperature of about 400 degrees during bombardment to produce maximum photovoltaic activity. Curves 10A, 10C and 10E indicate that as the energy of the ions which bombard the surface increase, the front-to-back current ratios at 1 volt tend to increase.

The varying effects of bombardment with ions of different energies observed in Figs. 10A, 10C and 10E further reenforce the densifying theory suggested since the change in electrical characteristics of the silicon can be attributed to the greater degree of mechanical working of its surface by the higher energy ions. The energy of a bombarding ion having a mass $m$, and a velocity at the time of striking the silicon $v$, where the electronic charge is $e$ and the total ion accelerating voltage is E, is:

$$Ee=\tfrac{1}{2}mv^2 \qquad (1)$$

Thus, it can be seen that the energy of the bombarding ion is proportional to the total ion accelerating voltage. Since the transfer of momentum upon impact of an ion with a silicon atom having a mass $m_{si}$ and a displacement velocity $v_{si}$ is:

$$mv=m_{si}v_{si} \qquad (2)$$

and conservation of energy upon impact requires that:

$$mv^2=m_{si}v_{si}^2+mV^2 \qquad (3)$$

where V is the velocity of rebound of the ion after striking the silicon and solved in terms of Equations 2 and 3 is:

$$v\sqrt{1-\frac{m}{m_{si}}} \qquad (4)$$

the energy transferred to the silicon by a bombarding ion is:

$$m_{si}v_{si}^2=mv^2-mv^2\left(1-\frac{m}{m_{si}}\right)$$

or (5)

$$m_{si}v_{si}^2=mv^2\left(\frac{m}{m_{si}}\right)$$

and $e$, $m$ and $m_{si}$ being constants is directly proportional to the accelerating voltage E.

Another observation which fits into the densifying theory and can be explained by substituting in the above equations is that ions having a large mass such as argon tend to give effects at one accelerating potential similar to those obtained by employing ions, such as helium, of less mass at greater accelerating potentials. If subscripts He and A are applied to $m$, $v$ and V in the preceding equations to represent bombardment with helium and argon, respectively, it will be seen that:

$$Ee=\tfrac{1}{2}m_{He}v_{He}^2=\tfrac{1}{2}m_Av_A^2 \qquad (1)$$

$$m_{si}v_{si}^2=m_{He}v_{He}^2\left(\frac{m_{He}}{m_{si}}\right) \qquad (a)$$

$$m_{si}v_{si}^2=m_Av_A^2\left(\frac{m_A}{m_{si}}\right) \qquad (b) \qquad (5)$$

Considering that the same accelerating voltage is applied and setting up a ratio between Equations 5*a* and 5*b*, the degree of densifying with helium ions as compared with that with argon ions is:

$$\frac{m_{He}}{m_A}$$

Thus, with the same energy of the particles, helium would be expected to deliver an energy through impact less than that from argon through impact by the ratio of $$\frac{4}{40} \text{ or 0.1 times}$$

Therefore, a voltage ten times the voltage used for argon ions would be expected to produce the same effect with helium ions.

It may be noted here that although the characteristic of Fig. 10E for the 8200-volt ion bombardment indicates that a superior rectifier is produced under these conditions, experience has indicated that a relatively wide range of characteristics are produced by bombardment with ion energies of this range and that the 1200-volt ionic bombardment is generally more satisfactory, particularly in silicon elements of higher purity. It is also to be noted from these direct current rectifier curves that the effect of the bombardment on the intrinsic resistance, i. e., that resistance observed when the conduction through the material is limited to that by electrons which have been thermally excited into an empty band, as opposed to that resistance observed when conduction occurs as a result of lattice imperfections or the presence of impurities, of the cells is increased from about 22 ohms in the case of an unbombarded sample to several thousand ohms where kilovolt ions were used. It has been found that the photovoltaic sensitivity in microamperes per lumen is very low for unbombarded material, and, as disclosed in Fig. 10B the bombardment with ions of a 45-volt average velocity increases the sensitivity of the surface several magnitudes; and it is further increased by the use of 1 kilovolt ions, as disclosed in Fig. 10D.

Figure 12:
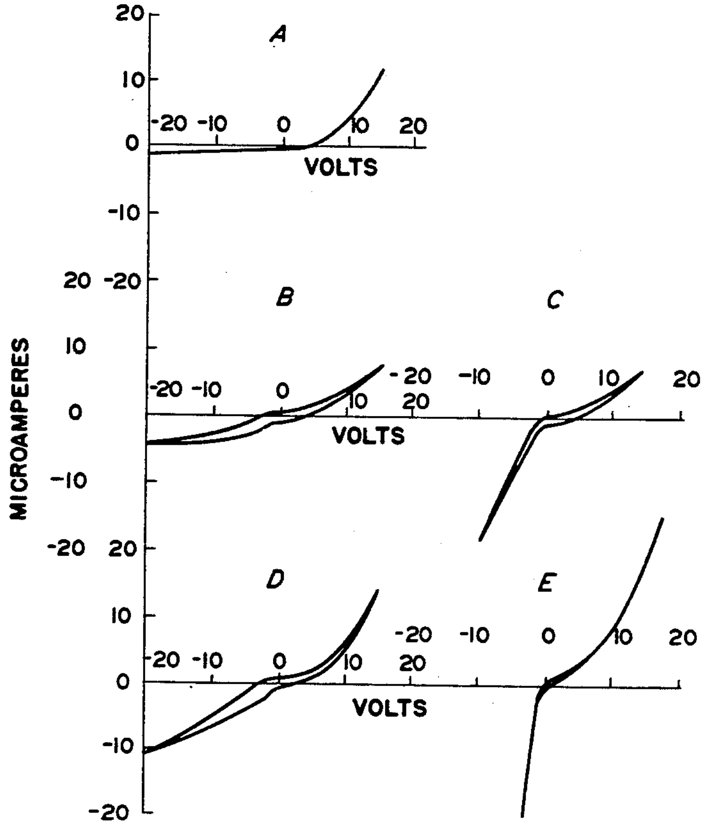
Figs. 12A to 12E are linear plots of voltage against current for a photo-resistive cell after various degrees of treatment, Figs. 12A, B and D showing the characteristics of the cells in the dark and Figs. C and E showing the characteristics for lighted cells.

The effects of bombardment time and ionic density on the resulting product are important up to a point, it having been found that the surface impedance of silicon drops with the length of bombardment time but reaches a limit beyond which additional bombardment is ineffective. Figs. 12A through 12E show typical voltage current characteristics for photoresistive cells in both the dark and illuminated conditions, Fig. 12A is typical for either condition before any bombardment. After five seconds of bombardment with high purity ionized nitrogen, the dark and illuminated characteristics appear as shown in Figs. 12B and 12C, respectively, and after thirty-five seconds of bombardment, they appear as in Figs. 12D and 12E, respectively. It is clearly evident from these curves that the surface resistance in both the dark and illuminated conditions is lowered by an increase of bombardment time, the bombarding current in the case of the samples being kept at 10 microamperes throughout the period. The limit of effective nitrogen bombardment for silicon has been found to be about 7,150 microcoulombs per square centimeter of surface. The computed number of nitrogen ions which must bombard the surface of the silicon in order that each exposed molecule be struck once corresponds to this amount of ionic bombardment, thus further supporting the suggested mechanical working or densifying theory of this treatment. In agreement with this, similar results have been attained by employing high ionic currents for short periods and low currents for long periods of bombardment.

Contacts can be made to the bombarded surfaces by a variety of means, such as by pressing a tungsten point on the bombarded area, by pressing a ring of gold-plated copper wire against the freshly treated surface, or by evaporating a coating, preferably of rhodium, on the bombarded surface. Evaporated contacts of cadmium, aluminum, silver, gold and nickel have been employed; however, these contacts do not have as good adherence to the silicon with the possible exception of the silver as does the rhodium. Further, the rhodium surface stands up well under soldering and temperature cycling up to about 300° C. and, therefore, is advantageously employed as the back contact for the silicon bodies.

Rhodium contacts may be placed on the unpolished back surface of the wafer either by electroplating or by evaporation. One method of evaporating rhodium contacts on silicon is as follows: The silicon is placed on a heater and mounted in a bell jar which can be evacuated to $2 \times 10^{-6}$ millimeters of mercury. A piece of rhodium wire is placed in the helix of a tungsten wire heater which is held about an inch above the silicon. The silicon is heated to about 300° C. to rid the surface of volatile oils and greases. Then evacuation of the bell jar is begun while a potential of about 800 volts silicon negative is applied between it and the tungsten heater to create an ionized discharge between these elements to further clean the silicon surface. When the pressure reaches $10^{-5}$ millimeters of mercury or less, the tungsten coil is heated to vaporize the rhodium with the potential still applied, thereby depositing the rhodium on the heated silicon surface. Where limited portions of a surface are to be coated with rhodium the same process is employed and the uncoated areas are masked.

Figure 7:
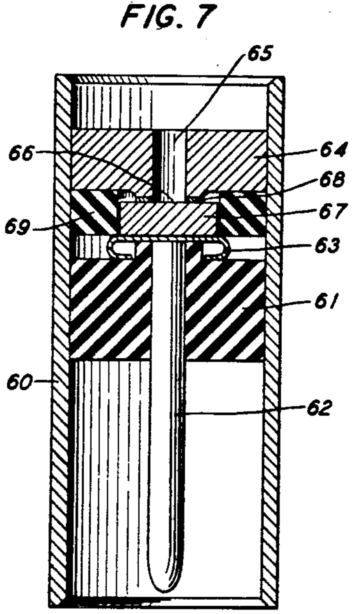
Fig. 7 shows a sectioned elevation of one form of photocell employing a silicon body treated in accordance with this invention.

Fig. 7 shows one type of mounting for a silicon wafer having a photosensitive surface treated in accordance with this invention. This type of mounting is suitable where small spots of radiation are to be detected or where modulated light is to be used, since the loss incurred by the capacity of the unused surface area is reduced. The mounting comprises a cylindrical body portion 60, which may be made of some conductive material, such as beryllium copper. The back contact assembly is formed of an insulating plug 61 in which is molded a contact 62, of some material such as nickel, on the end of which is carried a spring contact 63, which may be of tungsten. Inserted in the other end of the cylindrical housing 60 is the wafer assembly comprising an annular disc 64 of some conductive material, such as coin silver having a central aperture 65 for the admission of light to the surface 66 of a silicon wafer 67 which has been activated. The wafer is maintained in fixed relationship in the disc 65 by pressure from the tungsten spring 63 which forces an intermediate plated contact 68 (exaggerated in thickness for purposes of clarity) of some material such as rhodium against the disc to form the front contact for the device. A fiber insulating ring 69 may conveniently be employed to maintain the centering of the wafer 67. The contact to the plated rear surface of the wafer by the tungsten spring contact 63 provides the other electrical connection to the element.

These small wafers, which in an illustrative embodiment were 3/64 of an inch square, had their front and rear contacts applied prior to being cut to their final dimensions. For example, nine of these photocell elements may be formed from a 5/16 of an inch square piece of activated material by evaporating a continuous surface of rhodium on the rear of the larger wafer and by properly masking the front surface to produce front contacts having circular apertures for the admission of light to the activated surface. The large piece can then be cut into the smaller pieces to complete the elements.

Figure 8:
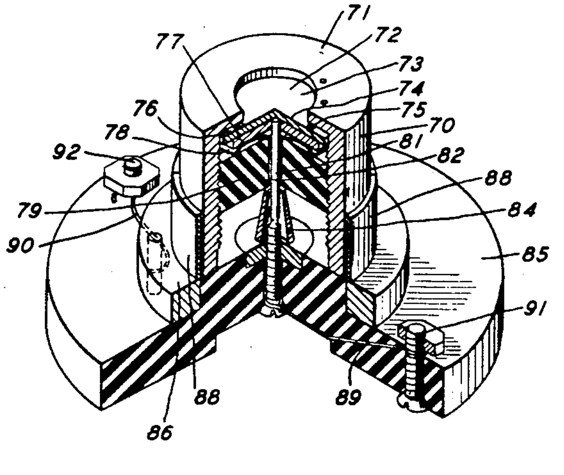
Fig. 8 is a perspective of another form of photocell in accordance with this invention with portions broken away to show details of the construction.

Fig. 8 shows a large area photocell mounting located in its socket. The cell comprises a conductive body portion 70 having an inwardly flanged end 71 defining a circular aperture 72 for the admission of light to an activated silicon surface 73 of a large area silicon wafer 74. A ring of gold-plated copper wire 75 is pressed between the inner face 76 of the flange on the body end 71 and the active face 73 of the wafer to provide a front contact either directly to the activated silicon or to a front electrode formed by plating a ring of conductive material such as rhodium on the active surface. Back contact is made to the wafer 74 by a flat conductive plate 77 which is biased against the wafer by an underlying pressure spring 78 intermediate it and an insulating plug 79 which is threaded to engage the threaded interior of the body, thereby providing a means of positively adjusting the contact pressure to the silicon. A contact pin 81 extends from the flat plate 77 on the rear of the wafer through an axial bore 82 in the insulating plug 79 and into a jack 84 molded in the insulating base 85 of the mounting. A metallic socket 86 having its sides split to provide resilient segments 88, which frictionally engage the cell casing 70 and provide contact thereto, is secured to the molded base 85 to provide the second contact to the cell. Suitable leads 89 and 90 extend from the jack 84 and socket 86 to mounting terminals 91 and 92 on the upper surface of the insulating base.

It is to be understood that the photocell structures of Figs. 7 and 8 may be employed either as photoresistive or photovoltaic devices. The characteristic which predominates will depend upon the activation treatment given the semiconductor portions since, as pointed out heretofore, the surfaces will exhibit both types of photo effects.

Figure 11:
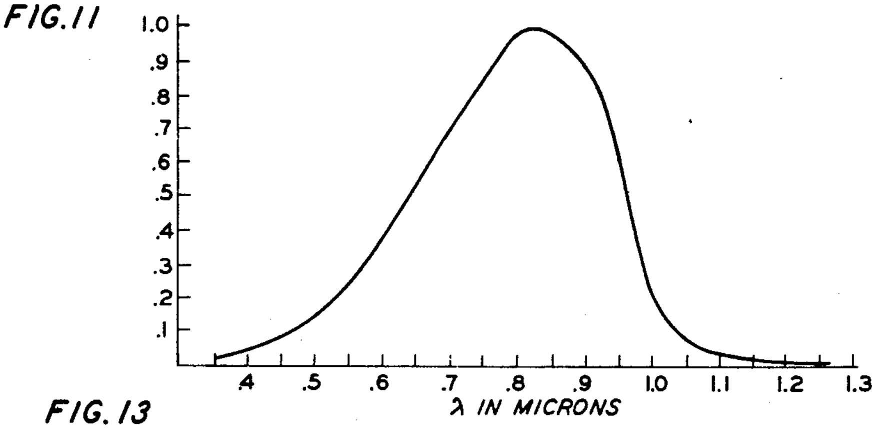
Fig. 11 is a relative equienergy spectral response curve for a silicon photocell constructed in accordance with this invention.

A typical equienergy spectral response curve corrected for spectrometer dispersion for a photovoltaic silicon cell is shown in Fig. 11. As shown in the curve, the wavelength of maximum response is about .825 micron. A true photon efficiency of about 70 per cent was found for a cell of the type shown in Fig. 8, exhibiting a current of 3.58 milliamperes per lumen at the wavelength of maximum response. Cells of the type shown in Fig. 7 having only 1/32 inch diameter of active area have shown efficiencies considerably higher than 70 per cent.

Figures 13, 16:
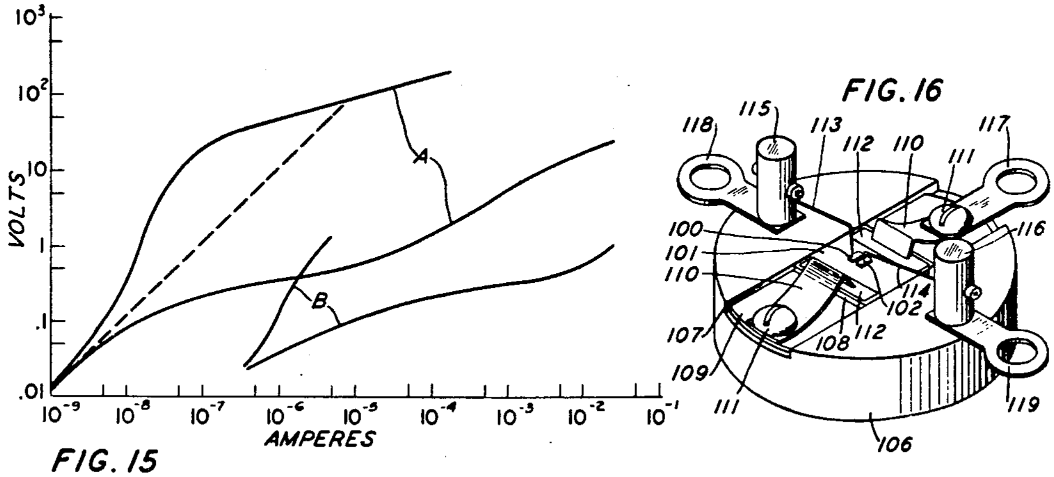
Fig. 13 shows the direct-current characteristic, curve A, of a tungsten-point contact silicon body rectifier having its silicon surface activated in accordance with this invention.
Fig. 16 is a perspective view of the structural details of one form of silicon body three-electrode amplifier constructed in accordance with this invention.
Figure 14:
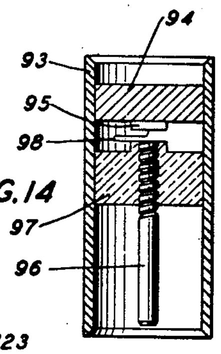
Fig. 14 shows one form of point contact structure suitable for using semiconductor wafers which have been ionically bombarded.

Fig. 13 is a logarithmic plot of the direct current characteristics of a point contact rectifier of conventional form, as shown in Fig. 14, but having a silicon surface activated by ionic bombardment in accordance with this invention. This device can be conveniently constructed with three basic components, a conductive cylindrical housing 93, which also serves as an electrical shield, a crystal assembly, and a contact assembly. The crystal assembly comprises a solid cylinder 94 of brass plated with tin, if desired, to which the bombarded silicon wafer 95 is affixed, as by soldering to a rhodium back contact prepared as set forth heretofore. The contact assembly includes a metallic pin 96, preferably of nickel, an insulating cylinder 97 molded around the pin, and a contact wire 98, which may be of tungsten, formed with a point contact on one end, and a central resilient loop, and secured to the pin 96 by spot welding. The rectifier is assembled by driving the crystal assembly and contact assembly into the opposite ends of the cylinder 93, where they are held, as shown, by a force fit.

As may be seen from Fig. 13, curve A, limited area contact units which have been subjected to ionic bombardment have high reverse resistances and can withstand constant potentials in excess of 300 volts. For comparison purposes, a typical characteristic of a 1N26 unit, a coaxial cartridge silicon .01 per cent boron unit having a tungsten point contact, curve B, is plotted on the same coordinates, thus illustrating the superiority of the bombarded units.

Figure 15:
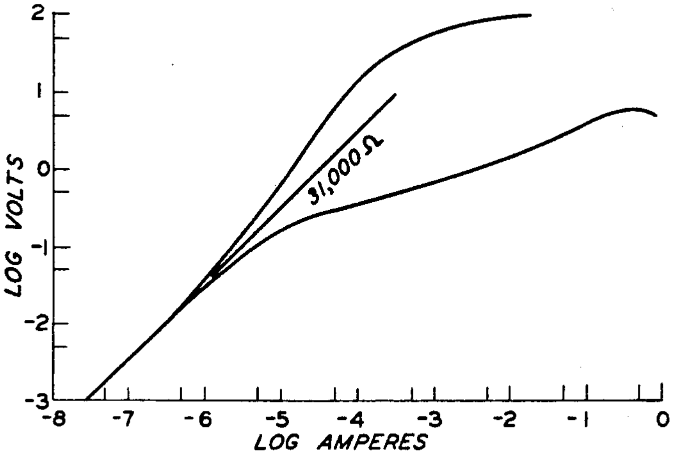
Fig. 15 shows a plot on rectangular coordinates of the logarithm of voltage against the logarithm of current for a silicon rectifier produced in accordance with this invention and employing a large surface contact.

Fig. 15 is a rectangular plot of the logarithm of voltage against the logarithm of current for an ionic bombardment activated silicon rectifier having a large area front contact of rhodium. This unit, a 5/16 inch square, which was treated with a helium and phosphorous ionic bombardment of 4,500 microcoulombs, the ion energies being of one kilovolt, illustrates utilization of the invention to produce silicon rectifiers having large current carrying capacities, particularly where a high conductivity surface has been produced by the addition of significant impurities to the ion stream. One form in which such a device may be produced is similar to the photocell of Fig. 7, that structure being modified by eliminating the aperture 65 in the front contact disc 64 and by forming a continuous front contact of rhodium over the bombarded surface.

The invention may be employed to advantage also in the production of point contact type silicon crystal harmonic producers. Heretofore, in the fabrication of such devices, for example, as disclosed in Patent 2,415,841, granted February 18, 1947, to R. S. Ohl, particular treatment, including electrical forming of the contact point, has been requisite to assure a high level of harmonic generation. Such treatment was found desirable where high purity surface layers are produced on silicon bodies of lower purity in order to prevent migration of significant impurities from the body into the surface layer, the electrical forming fixing the impurities in the body by lodging the aluminum ions within the lattice structure of the silicon, thereby blocking the path through which the migrating ions traveled. Boron, one of the most frequently occurring impurities in highly refined silicon, while useful in some semiconductive devices, such as detectors, is extremely mobile and, therefore, is an undesirable impurity in devices which are subjected to alternating voltages greater than those employed for signal detection or frequency conversion and which require stable surfaces having characteristics other than those of the body.

Harmonic producers, for example, of the construction illustrated in Fig. 14, including a silicon crystal having one surface, the one against which the point contact bears, treated by ionic bombardment in accordance with this invention, have been found to have particularly advantageous characteristics and to require no electrical forming. For example, typical devices wherein the body 95 was of silicon containing 0.02 per cent boron have been found efficiently operable over a greater range of fundamental frequency input power than prior devices. Such devices are useful also as efficient signal detectors and frequency converters. A typical operating bias on the point contact for these cases is about ¼-volt positive.

A further type of the device which can be produced by an ionic bombardment of silicon is shown in perspective in Fig. 16. This device which exhibits power gain is commonly known as a transistor. The term transistor applies to a device comprising, in general, a body of semiconductive material and three connections, termed the emitter, base and collector, to spaced regions of the body. In operation of the device, the collector is biased in the reverse direction, i. e., in the high resistance diode rectification direction of the body-collector combination, and the emitter is biased, usually in the forward direction, relative to the body. Amplified replicas of signals impressed between the emitter and base connections are obtainable in a load circuit between the base and collector connections. In devices wherein the semiconductor body is of P conductivity type material, as in the case of the samples under consideration here, the operation may be explained on the basis of the injection of electrons by the emitter into the body, the flow of these electrons to the collector region, and a substantial modification of the impedance of the collector to body connection by the electrons. Thus, in Fig. 18, a negatively biased emitter 100 in the form of a limited area contact is mounted in close proximity, .002-inch spacing being satisfactory, to a similar positively biased collector 102, and a signal source 103 is located in the emitter circuit between it and the base 104, while a load is positioned in the collector circuit between the base and collector.

The structure of the transistor shown in Fig. 16 includes a base 106 of insulating material, for example, hard rubber, having a transverse slot 107 in its upper surface in which the silicon wafer 108 is located. A base contact plate 109 and cantilever springs 110 are secured in the slot 107 by screws 111. The plate, in combination with the springs 110, which serve as clamping means to hold the wafer in position, form the contacts to the transistor base. These contact springs bear on the rhodium-plated areas 112 on the front of the wafer, while the plated rear of the wafer rests on the plate 109 to insure a highly conductive connection thereto. Cantilever mounted spring wires 113 and 114 having offset ends contact the closely spaced rhodium-plated strips serving as emitter and collector 100 and 102. These wires are secured to conductive columns 115 and 116 mounted on the insulating base member. Terminals 117, 118 and 119 are provided for the base, emitter and collector electrodes, respectively.

Figure 18:
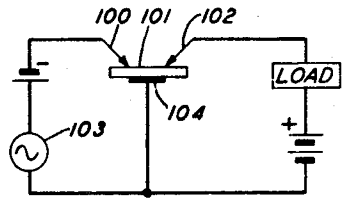
Fig. 18 is a circuit diagram in which the devices of Figs 16 and 17 might be employed.
Figure 17:
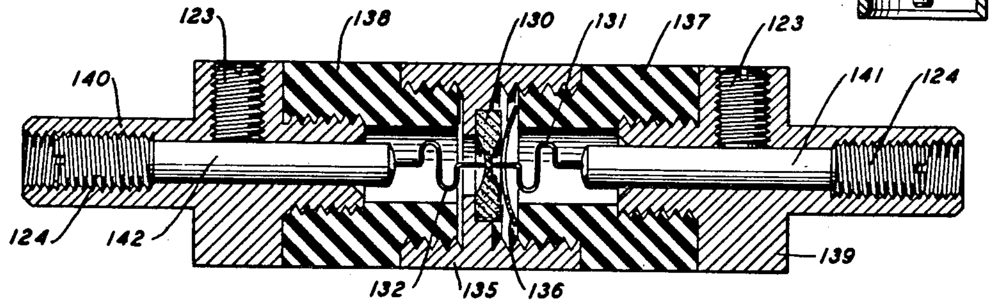
Fig. 17 is a sectioned elevation of another three-electrode amplifier employing a semiconductive body treated in accordance with this invention.

An alternative form of transistor suitable for incorporation in a circuit of the type shown in Fig. 18 is shown in Fig. 17. This device comprises a symmetrical silicon disc 130 mounted in a cylindrical housing 135 with conductors 131 and 132 making contact, respectively, to opposite faces of a thin portion of the disc. The disc 130 may be made by cutting a circular piece about 0.125-inch in diameter from a thin slab of silicon (about .025-inch thick) and lapping a spherical depression in each face so that at its thinnest portion, the element is a few mils thick (.002 to .004-inch). The disc is then subjected to an ionic bombardment activation process. The disc 130 is seated in a counterbored portion of the internally threaded metal cylinder 135, and a spring washer 136 backed by the threaded insulating member 137 holds it in place. A similar insulating member 138 is screwed into the opposite end of cylinder 135, and terminal members 139 and 140 are secured by screw threads to the outer ends of insulating members 137 and 138 to serve as supports for studs 141 and 142. The studs are slidably fitted in axial bores in the terminal members and may be secured in place by set screws 123 and backed by set screws 124. Pointed contact wires, which may be of tungsten, forming conductors 131 and 132 having intermediate S-shaped spring portions are secured in axial bores in the ends of the studs, as by solder.

It has been found particularly advantageous to subject units, especially the emitter contact, of the type illustrated in Fig. 17 to an electrical forming treatment to improve their stability, increase emission from the emitter and increase the reverse impedance of the junction between contact and semi-conductor body. Satisfactory operating characteristics have been obtained from units of the type shown in Fig. 16 with no special forming treatment. One illustrative treatment comprises applying a short time pulse of direct current in the forward direction, i. e., semiconductor positive relative to the contact. In another illustrative case, the forming is effected by the application of an alternating current pulse between the contact and the base, controlled so that the major portion of the power is expended in the forward direction. A more detailed discussion of forming techniques and their advantages appears in the application Serial No. 90,022, filed April 27, 1949, of W. G. Pfann.

P-type silicon wafers of the form shown in Fig. 17 have exhibited transistor action after having been ionically bombarded on either the emitter or collector contacting surface when connected in a circuit of the type shown in Fig. 18. While these surfaces providing transistor action have been produced over a wide range of bombardment temperatures, it has been found that the greatest power gain could be obtained from those which were activated at a temperature of around 350° C.

It is to be understood that the above described arrangements and processes are illustrative of the application of the principles of the invention.

For example, although the invention has been described with particular reference to the treatment of silicon bodies, it may be utilized also in the preparation of other semiconductors, such as germanium, for signal translating devices. Ionic bombardment of diamond has also resulted in changes in the conductivity characteristics of that material. It will be appreciated also that various modifications may be made in the specific structures and processes herein described without departing from the scope and spirit of this invention.

The mechanical working or densifying of the semiconductor surface suggested as the operating principle of the ionic bombardment process is not to be interpreted as limiting the invention to such a theory; rather, it is suggested as the most consistent theory presently available and has been employed as an aid in describing and explaining the invention. The term "densifying" as employed heretofore and in the claims refers to the effects of ionic bombardment.

Reference is made of the application Serial No. 137,906, filed January 11, 1950, of W. G. Pfann, wherein a related invention is disclosed and claimed.

What is claimed is:

1. The method of producing a permanent photosensitive layer upon a body of silicon which comprises polishing a surface of the body, heating the body to a temperature in the range of 370° to 430° C., bombarding said surface of said heated body with a stream including ions of a gas and ions of a conductivity type determining impurity.

2. The method of permanently altering the electrical characteristics of a silicon body which comprises polishing the surface of the body, heating the body to a temperature in the range of 300° C. to about 550° C., and bombarding the polished surface of the heated body with ions selected from the group consisting of helium, nitrogen, and argon.

3. An electrical translating device comprising a body of semiconductive material selected from the class consisting of silicon and germanium, an integral surface layer on said semiconductive body having electrical characteristics other than those of said body, produced by bombardment thereof with ions of significant impurities, an ohmic connection to said body on a portion spaced from said layer, and a large area contact engaging said layer.

4. An electrical translating device comprising a body of silicon, a high back voltage barrier layer on one surface of said body produced by bombardment thereof with ionized gas, a large area contact engaging said surface, and an ohmic connection to said body.

5. An electrical translating device comprising a body of silicon, a high back voltage barrier layer on one surface of said body produced by bombardment thereof with ions, a large area contact engaging said surface, and an ohmic connection to a portion of said body spaced from said surface.

6. A photosensitive device comprising a silicon body, a photosensitive surface on said body produced by bombarding said body with ions, a large area contact on said surface arranged to permit light to fall on said surface, a holder for said body exposing said surface, and a contact to a portion of said body spaced from said surface.

7. A signal translating device comprising a body of silicon having in one surface thereof a zone formed by ionic bombardment, emitter and collector connections to said body, one of said connections being of large area and connected to said zone, and a base connection to said body.

8. A signal translating device comprising a body of silicon having in one surface thereof a zone formed by ionic bombardment, a pair of closely spaced metallic coatings on said body, at least one of said coatings being of large area and connected to said zone, emitter and collector connections to said coatings, and a base connection to said body.

9. A signal translating device comprising a wafer of P conductivity type silicon having in one major face thereof a zone formed by bombardment of an area of said face with ions, a first connection of large area to said zone, a second connection to said body in immediate proximity to said zone, and a base connection to said body remote from said first and second connections.

10. The method of permanently altering the electrical characteristics of a semiconductive material selected from the class consisting of germanium and silicon which comprises polishing a surface of the material, heating the surface to a temperature in the range of 300° C. to about 550° C., and bombarding the heated surface with ions of a conductivity type determining impurity selected from the third and fifth columns of the periodic table.

11. The method of permanently altering the electrical characteristics of a body of semiconductive material selected from the class consisting of germanium and silicon which comprises polishing a surface of the body, heating the body to a temperature in the range of 300° C. to about 550° C., and bombarding the heated body with an ion stream including an ionized gas selected from the group consisting of helium, nitrogen, and argon and ions of a conductivity type determining impurity selected from the third and fifth columns of the periodic table.

12. The method of processing a p-type silicon body to permanently alter the electrical characteristics of a surface layer thereof which comprises polishing a surface of the body, heating the body to at least 300° C., bombarding the polished surface of the heated body with helium and phosphorous ions until about 4500 microcoulombs of charge have been passed by the bombarding stream and maintaining the silicon body at about one kilovolt negative with respect to the anode from which the bombardment is supported.

13. The method of controlling the electrical characteristics of a surface layer of a body of P conductivity type semiconductive material selected from the group consisting of silicon and germanium which comprises heating said body to a temperature in the range of 300° C. to about 550° C., and bombarding a surface of said heated body with a stream of ions having energies of the order of 1,000 electron volts, said stream including ions of a conductivity type determining impurity.

References Cited in the file of this patent

UNITED STATES PATENTS

| | | |
|---|---|---|
| 2,163,393 | Brunke et al. | June 20, 1939 |
| 2,293,248 | Fink et al. | Aug. 18, 1942 |
| 2,462,218 | Olson | Feb. 22, 1949 |
| 2,563,503 | Wallace | Aug. 7, 1951 |

FOREIGN PATENTS

| | | |
|---|---|---|
| 497,034 | Great Britain | Dec. 12, 1938 |